July 21, 1970          F. J. WILKINS          3,521,351
METHOD OF MAKING THERMO-ELECTRIC DEVICES
Original Filed Feb. 23, 1966          5 Sheets-Sheet 1

INVENTOR
F. J. WILKINS
BY
Cameron, Kerkam & Sutton
ATTORNEYS

July 21, 1970   F. J. WILKINS   3,521,351
METHOD OF MAKING THERMO-ELECTRIC DEVICES
Original Filed Feb. 23, 1966   5 Sheets-Sheet 4

INVENTOR
F. J. WILKINS
BY
Cameron, Kerkam & Sutton
ATTORNEYS

July 21, 1970 F. J. WILKINS 3,521,351

METHOD OF MAKING THERMO-ELECTRIC DEVICES

Original Filed Feb. 23, 1966 5 Sheets-Sheet 5

INVENTOR
F. J. WILKINS
BY
Cameron, Kerkam & Sutton
ATTORNEYS under vacuum, will be very small, and conduction from the cold junctions by the leads to other components at about room temperature. In these circumstances the output of the instrument should

United States Patent Office
3,521,351
Patented July 21, 1970

3,521,351
METHOD OF MAKING THERMO-ELECTRIC DEVICES
Frederick John Wilkins, Surrey, England, assignor to National Research Development Corporation, London, England, a British body corporate
Original application Feb. 23, 1966, Ser. No. 529,522, now Patent No. 3,382,108, dated May 7, 1968. Divided and this application Oct. 10, 1967, Ser. No. 710,411
Claims priority, application Great Britain, May 10, 1963, 18,699/63; Feb. 23, 1965, 7,861/65
Int. Cl. B01j 17/00; H01l 15/00; H01n 49/00
U.S. Cl. 29—573                                     5 Claims

ABSTRACT OF THE DISCLOSURE

A multi-junction thermo-electric convertor has the junctions produced by coatings of discrete lengths of one electrically conductive material on a continuous length of very fine wire of another electrically conductive material, the wire being wound into a helix with two rows of junctions formed by the ends of the coatings, the cross section of the helix being triangular with one row of junctions at an acute angled apex of the helix and the other row remote therefrom. An electrically heated rod-like support is secured to the helix along the row of junctions at the apex and serves both to support the helix and to heat the row of junctions at the apex, while at least one other rod-like support is secured to and extends along the helix at a position remote from the first support. The first support may be a hairpin looped electric heater, and two such helices may be intermeshed with the heater common to both. The convertor structure may be housed in a surrounding shielding enclosure, preferably evacuated, of high thermal and electrical conductivity which minimises heat loss and serves as a sink for the cold junctions.

---

This application is a division of my application Ser. No. 529,522, filed Feb. 23, 1966, now Pat. 3,382,108.

The present invention relates to multi-junction thermo-electric devices, comprising a continuous length of an electrically conductive material, and coatings thereon over discrete lengths of another electrically conductive material, the coating material being of substantially higher conductivity than the continuous length. Provided thickness and contact between the coatings and continuous length are adequate in conjunction with the higher conductivity of the coatings to ensure that the coated lengths behave thermo-electrically virtually as if they consisted only of the coating material, thermo-junctions are formed at both ends of every length of coating and by suitably disposing the junctions so that alternate junctions can be brought to different temperatures, a series arrangement is achieved. This has been done for example by winding the continuous length into a helix, the dimensions being such that the alternate junctions form two oppositely located sets along the helix (rows when the helix is in its original straight configuration). It was moreover proposed to wind such a helix spirally to bring the junctions even closer together for exposure in a surface exposed to heating, thus to produce a meter for measuring heat flow per unit area.

The materials of the continuous length and the coatings must be selected to satisfy the above requirements, but within this restriction they may be selected to give a high rather than a low thermal E.M.F. The required difference in conductivity is best satisfied by choosing a resistive alloy for the continuous length, for example a copper nickel alloy such as constantan, and a single metal of high conductivity for the coatings, for example silver, copper or iron. Copper is a preferred choice as silver is more liable to tarnishing while iron is of lower conductivity. Good contact and adequate thickness of copper are readily achieved by electroplating a thin resistance wire. Hereinafter constantan and copper will be assumed without limitation thereto being implied.

An object of the present invention is to combine a thermo-electric device of the above described character with an electric heater in such a way that it can serve as a convertor of high accuracy, the output voltage of which is a function of the heating current. Such a convertor can then be used for example as a D.C./A.C. transfer instrument for measuring alternating currents, the current or a known fraction of it serving to energise the heater, while the output of the thermocouple device is applied to an instrument such as a millivoltmeter.

D.C./A.C. transfer instruments using a single thermo-junction are well known and their advantages and disadvantages have been investigated, see for example Hermach "Thermal converters as A.C./D.C. transfer standards for current and voltage measurements at audio-frequencies," J. Res. Nat. Bur. Stand. 1952, 48, p. 121. It has also been proposed to use a longer heater than in a single thermo-junction instrument and sampling of its temperature at a number, say 20, of points along its length by a multi-junction system, alternate junctions, which are cold junctions, being mounted in the housing of the instrument. A multi-junction system has basic advantages in the attainment of high accuracy and high sensitivity, and from this point of view the greater the number of junctions, the better. On the other hand while some thermal inertia is essential to enable the instrument to take up a mean temperature which is a measure of the mean-square value of the current in the heater, the thermal inertia must not be so large that the time constant of the instrument becomes excessive.

The above described helical multi-junction device has both a high output and low thermal inertia but the convertor consisting of the combination of the helical device and heater needs to have a structure which will give high accuracy and low response to ambient conditions.

According to the invention the convertor comprises a continuous closely spaced helix, the cross section of which helix has at least one apex, made of a continuous length of thin electrically conductive material, a coating on the same part of the length of each turn thereof extending from said apex, the coatings being of substantially higher conductivity than the continuous length and the thickness and contact between the coatings and the continuous length being adequate in conjunction with the higher conductivity of the coatings to ensure that the coated parts behave thermo-electrically virtually as if they consisted only of the coating material, whereby two rows of thermo-electric junctions are formed at the ends of the coated parts, one row at said apex of the helix and the other row remote therefrom, a first rod-like support heatable by the passage of an electric current extending along the helix at said apex, electrically insulated from but in good mechanical connection with the helix, and at least one other rod-like support extending along the helix at a position remote from said first support, the greater part of the cross section within the helix being unobstructed.

Such a structure either by itself or with auxiliary supports which do not impinge into the unobstructed cross section within the helix retains its form while ensuring that a large fraction of the heat developed by the heater is converted into electrical energy by the thermocouples. Moreover, the fraction will only vary systematically for different rates of imput, and will not be subject to random variations if ambient conditions are kept constant. The heat lost comprises conduction from the heater to the leads, which in general will vary systematically with the heating current, radiation which, with the junctions closely spaced and conditions chosen so that the temperature rise of the heater is not great, will be small and to a first approximation linearly proportional to the heating current, and convection if the converter is in air. A suitable enclosure can be used to minimise this or better still the enclosure may be evacuated. Such an enclosure can be of high heat capacity and serve as a sink for the cold junctions.

The law of the convertor will include a factor dependent on the temperature of the helix, i.e. it will have a temperature coefficient, but by suitable choice of the thickness of the coatings, as will be explained, this can be brought substantially to zero. Alternatively, the thickness can be chosen to give maximum output for a given input current.

By locating the other rod-like support at the other row of thermo-electric junctions and making this support itself heatable by the passage of an electric current, there may be formed a differential convertor, i.e. one in which two electric currents (flowing in the respective heaters) can be compared.

A desirable cross-sectional form of the helix is triangular, not too far removed from an equilateral triangle. Then there can be a rod-like support at each apex, one or two being heaters and the other suitably a strip of mica or the like against which the turns of the helix are pressed, forming a longitudinal zone by which the helix can be supported in good heat conductive contact with an enclosure. In that case the cold junctions will be at this longitudinal zone, the coatings extending round one side or preferably two sides of the triangle.

Desirably the rod-like supports are secured by cement to the helix so that a permanent structure is achieved independently of other supports. The support (or supports) which serve as a heater may be of monofilar or bifilar construction. It will be understood that if any support is of metal it must be electrically insulated from the helix though where it is a heater it should make good heat conductive contact.

A development of the invention which is convenient for some purposes is to provide three-rod-like elements one in the centre and the other two spaced from it and from one another, and for the thermocouple series to include two sets both wound in the form of an actue angled helix cover the central rod-like member but only over a respective rod-like member to one side and the other of the central member, the junctions at the central member alternating along it. With this construction the centre member will usually be the heating element while the other two will be cold wires or bars.

It should be understood that the term closely spaced means from say fifty turns per inch (two per millimetre) to as close as is practicable without contact between the turns. The continuous conductor is suitably a fine wire or say 0.0008 inch to 0.002 inch dia. It will be evident that such a conductor when wound into a helix is not self-supporting.

The invention also includes methods of making the convertor which will be described.

The invention will be further described with reference to the accompanying diagrammatic drawings, in which—

Figure 1:
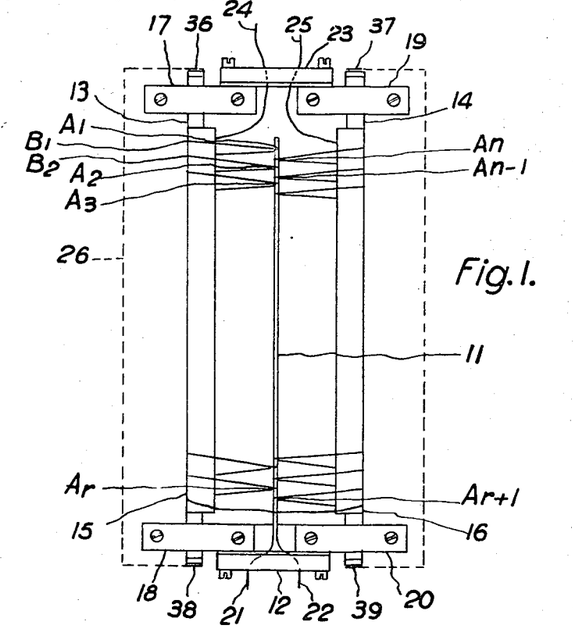
FIG. 1 is a plan view of a complete thermo-electric convertor, according to a first form of the invention.

Referring to FIG. 1, the heater element 11 is a narrow loop of wire, secured at one end by a clamping block 12. The heater element is contacted by a number of thermo-junctions $A_1, A_2 \ldots A_{r+1}, A_{n-1}, A_n$, the thermo-junctions being in the form of loops, each of which embraces both legs of the heater element. To each heated junction A, corresponds a cold junction B, as remote as practicable from the heating element. Each cold junction, likewise, forms a loop. All the cold junction loops on the left of FIG. 1 embrace a copper bar 13, and those on the right a similar copper bar 14. The cold junctions are electrically insulated from the copper bars by paper folds, 15, 16. Bar 13 is kept in position by clamps 17, 18, and bar 14 by clamps 19, 20. The clamps are mounted on a baseplate (not shown). Desirably, the clamps and base plate are made of polymethylmethacrylate resin ("Perspex"). This is true also of clamp 12 for the heater leads 21, 22 and of clamp 23 for thermocouple leads 24, 25. The whole is mounted in a surrounding shielding box 26, of material of high electrical and thermal conductivity, suitably copper foil, blackened on the inside. The copper bars 13, 14 are soldered to the box. The box is made with apertures large enough to allow the leads 21, 22, 24, 25 to pass through. Best results are obtained if the convertor is placed in an evacuated enclosure.

In that case, since heating during evacuation is desirable a thermally more resistant material than polymethylmethacrylate resin should be used for the clamps and baseplate, for example polytetrafluoroethylene.

By way of example the heater element in one specific embodiment is of the order of 1½ inches long (i.e. about 3 inches of wire) and consists of 0.002 inch diameter resistance wire such as the quaternary alloy "Karma" comprising 72% nickel, 22% chromium, 1½% iron and the remainder aluminium, having a coating of a suitable adhesive such as "Durofix," a solution of cellulose acetate in amyl acetate and acetone which gives it additional stiffness. Any original insulation on the wire is retained.

Figure 2:
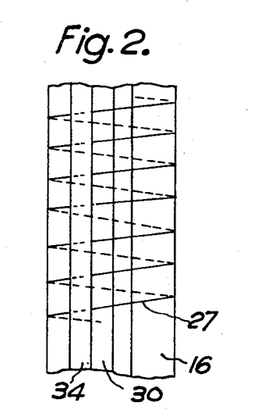
FIGS. 2, 3, 4 and 5 illustrate stages in the manufacture of the multiple thermo-junctions.
Figure 3:
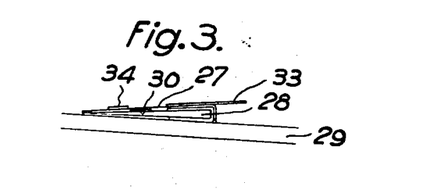
Figure 4:
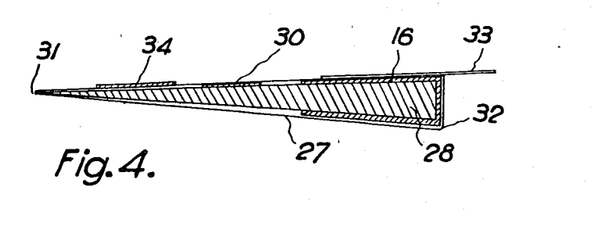

Thermocouples are prepared as follows (see FIGS. 2 to 4). A length of constantan wire 27, sufficient to make a predetermined number of thermo-junctions, is wound on a core 28 of an electrically insulating material which can subsequently be dissolved away in a specific solvent; a very suitable material is polystyrene. One side of the core should be flat and the flat should occupy nearly half the periphery. A very suitable form of core has the wedge section of narrow wedge angle. For the specific embodiment being considered, wire of 0.001 or even 0.0008 inch diameter is suitable and the polystyrene core has a width of about 5/16 inch and a wedge angle of about 3°. In order that a gap shall be left between the turns of wire and the polystyrene core, the thicker side of the core is enclosed, up to about ⅓ the breadth, with a spacer 16 of insulating material which will not dissolve in the solvent for the polystyrene, suitably a fold of shellac impregnated paper, desirably having a thickness of 0.0005 inch. When all the wire required has been wound onto the polystyrene core, the latter is cemented down to a convenient support 29 with polystyrene solution, as indicated in FIG. 3. Then a strip 30 of fine copper foil is slipped under the turns of wire or pressed against them. In a suitable electrolytic bath, by passing a current through the copper strip, the wire on the exposed side of the wedge core is plated with copper. There is such a large difference between the conductivities of copper and constantan that the copper plated portions of the wire act virtually as if they were solid copper. Thermo-junctions are therefore formed at the points 31, 32 (FIG. 4) of each turn of the wire round the wedge core. After the plating process insulating strips which do not dissolve in the solvent for the polystyrene, suitably a mica strip 33 and a paper strip 34 are cemented to the assembly with a cement which also does not dissolve in the solvent for polystyrene, suitably shellac. The whole is then immersed in benzene which dissolves away the wedge strip and releases the wound wire, with the paper fold 16, the mica strip 33, and the paper strip 34, from the base 29. The paper strip serves to keep the loops at the correct spacing; the mica strip serves the same purpose and additionally facilitates handling.

Figure 5:
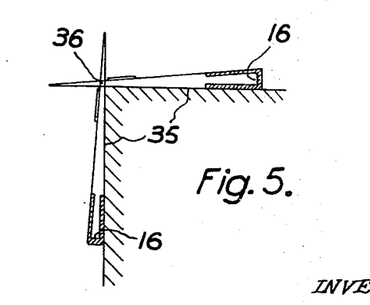

Two sets of thermocouples, prepared as described above, are required for each convertor according to the present embodiment. The two are interleaved at right angles as shown in FIG. 5. This step is facilitated by coating the surfaces 35 thinly with petrolatum ("Vaseline"). A heater element 11 is then inserted at 36 through all the loops of the two sets of thermocouples. Copper bars 13, 14 are then threaded through the paper fold in each set. The copper bars may be about 1/16 inch wide and 0.02 inch thick. The clamps 17, 18, 19, 20 are then placed in a jig (not shown) and the copper bars, bearing the thermocouple sets and heater, are placed in the clamps. Jig attachments pull sideways on the copper bars until the thermocouple loops (the hot junctions) make good contact with the heater element, and the clamps are then tightened. The jig may then be removed. The paper and mica strips 33, 34 are next removed by dissolving away the shellac with alcohol. The connections to the heater and the thermocouples are then clamped at 12 and 23 and soldered to the external leads. The copper foil box 26 is then put round the assembly and soldered at 36, 37, 38, 39 to the ends of the copper bars 13, 14. This provides that the cold junctions, $B_1$, $B_2$ and so on, are kept as nearly as possible at the temperature of the surrounding copper shielding box 26.

In the present embodiment the number of hot junctions is 55, but there could be fewer or even more. A great advantage accruing from the use of so many couples is that a much smaller temperature rise can be accepted than with conventional convertors, i.e. about 4° C. as compared with about 200° C. This gives much better obedience to Newton's Law and hence better adherence to the desired square law relation between heater current and thermocouple output. A typical output of a conventional convertor would be 6 to 7 mv. as a maximum, whereas the present embodiment according to the invention will give an output of 100 to 120 mv. It has a maximum heater current of the order of 70 ma. The heater resistance is about 40 ohms and the thermocouples have a resistance of 400 ohms. The specific output, i.e. millivolts input to the heater, is substantially higher than that obtainable from the conventional single junction convertors.

The present invention has a short response time, that is the time for the convertor to reach within 1 percent from its final reading, of about 4 seconds.

Except for the use of a differential convertor to compare a direct current with an alternating current, a direct current is generally only used in the heater for calibration. Convertors according to the present invention have a very low D.C. reversal, that is the change in output when the polarity of the heater when supplied with direct current is reversed, the value not exceeding one part in $10^5$.

Figure 6:
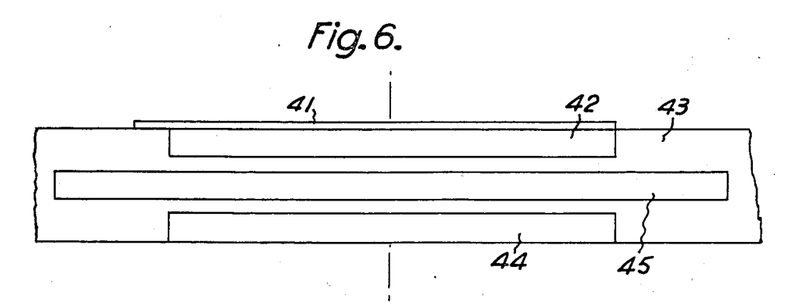
FIGS. 6, 7 and 8 illustrate stages in the manufacture of a second form of the invention.

The form of the invention now to be described with reference to FIGS. 6 to 8 enables even more junctions to be included conveniently in a given space than that above described and also facilitates the production of a differential convertor, i.e. a convertor with a heating element at each row of junctions, while still having advantages and properties of the same order as the first described embodiments.

In this form the heater wire 41, either single or bifilar, is attached to one of the long edges of a rectangular piece 42 of thin mica, for example 1 inch by 1/16 inch by 0.001 inch. This mica is fixed by polystyrene cement to a piece 43 of polystyrene of the same length, greater width, say 4 times, and greater thickness say 0.010 inch, so that it is placed centrally lengthwise and so that the heater just protrudes beyond the edge of the polystyrene. A second piece 44 of thin mica of the same size as the first is attached to the same side of the polystyrene as the first piece but along the opposite edge as shown in elevation in FIG. 6. If a differential convertor is being made this mica also carries a heater.

A pieces 45 of highly conductive, suitably copper, foil suitably 0.0005 inch thick and approximately 1/16 inch wide is placed on the surface of the polystyrene 43 so that it lies between the two pieces 42, 44 of mica. It is lightly fixed to the polystyrene by polystyrene glue at its ends. This copper serves to make electrical contact to the constantan wire afterwards wound on.

Figure 7:
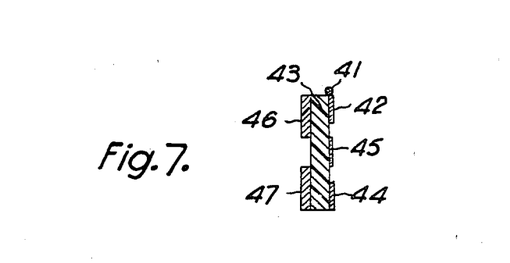
Figure 8:
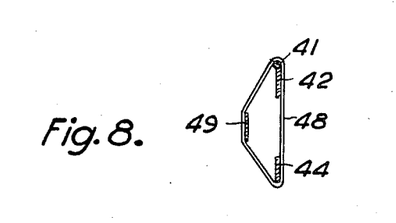

Two further pieces 46, 47 of mica longer, wider and stouter than the pieces 42, 44, say 1¼ inches by 3/32 inch by 0.005 inch are glued to the other surface of the polystyrene 43 resulting in a section shown in FIG. 7. These pieces 46, 47 of mica stiffen the polystyrene, so that the wire can be wound around it.

Constantan wire 48, suitably 0.0008 inch diameter, is wound under the maximum possible tension on the composite strip. A spacing of 0.006 inch between adjacent turns is easily achieved but can be made larger or even smaller according to requirements. After winding the turns are attached to both pieces 42, 44 of mica by means of a thin solution of "Durofix." The polystyrene 43 is bonded to a further piece of polystyrene so that the two pieces 42, 44 of mica and the copper foil 45 are sandwiched between the two. The exposed part of the constantan wire 48 is then plated with copper. It will be noted that the plating will extend right up to the heater 41.

After plating a third piece 49 of thin mica of the same size as the pieces 42, 44 is introduced. It is inserted between the pieces 46, 47 of mica, and the plated wire, and is placed over the gap between these two pieces of mica. The plated wires are fixed to this piece 49 by means of a thin solution of "Durofix." The plated wires are attached to the heater or heaters by running a thin solution of "Durofix" along its length. The assembly is then immersed in benzine and the polystyrene dissolved away. At this stage the stiffening pieces 46, 47 of mica and the copper strip 45 are free and can be removed. This leaves the heater or heaters attached to the wire winding with the wire on one side of the assembly plated. FIG. 8 illustrates the assembly in section.

It will be understood that the use of mica is not essential for the strips 42, 44, 46 and 47. What matters is that they shoulud be of insulating material of adequate strength which is not soluble in the solvent used for dissolving the strip 43 and can be secured by a cement which will dissolve in the solvent.

To complete a single heater type of converter the cold junctions are embedded in a groove in the copper base of a copper housing that can be evacuated. The junctions are insulated from the copper base by means of thin paper strip, say 0.0005 inch thick. For a differential type with a heater at both sets of junctions the complete assembly is supported so that it hangs freely inside an evacuated copper housing. In this second form of the invention, with a spacing of 0.006 inch, 160 couples can be included in the same lengths as 55 in the case of the first described form, thus enabling an output of up to 600 millivolts to be obtained.

The forms of the converter above described all have the helix into which the coated conductor is wound of triangular cross-section with one row of junctions and a rod-like support constituting a heater at one apex, and at least one other longitudinal support extending along the helix at a position remote from the heater. In FIGS. 1 to 5 the triangle is of narrow form, i.e. it has a very acute angle at the apex where the heater is located, while the other longitudinal support extends to both other apices also the heater is common to two interlaced helices. A single helix could be used, all to one side of the heater, but then if the hot junctions are not actually cemented to the heater, external supports are needed to hold the parts in correct relative position. In the form described with reference to FIGS. 6 to 8, the triangle has two apices with an acute angle and a support at the obtuse apex set parallel to the side joining the two acute apices. FIGS. 9 to 15 now to be described relate to a preferred arrangement in which the triangular section is more nearly equilateral and the support corresponding to the support 49 of FIG. 8 is set perpendicular to the side joining the other two apices, the helix being flattened down on to this support to provide a convenient form in this region for mounting the completed helix.

Referring now to FIGS. 9 to 13, by way of example the wire 51 on which the thermojunctions are formed is of 0.0008 inch diameter (0.02 mm.) constantan and is wound on a core 52 of equilateral triangular cross section having a side length of ⅛ inch (3 mm.). The core is made of polystyrene and is subsequently dissolved away. As many as 300 turns per inch (12 per mm.) can be wound, but this is about the maximum, and a convenient number is 200 turns per inch (8 per mm.). The very fine helix of thermocouple wire is rendered rigid by having attached to it, substantially along each apex at the edge of the core respectively, a heater wire 53 (twisted loop), a support wire 59 (also a twisted loop) and a strip 55 of mica.

Figure 9:
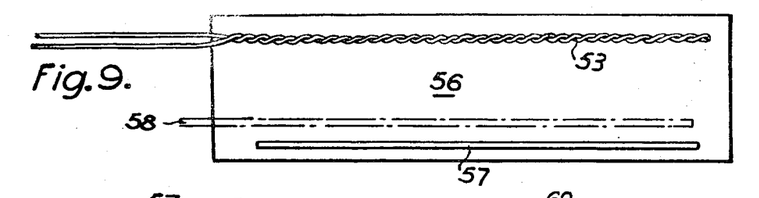
FIGS. 9, 10, 11, 12 and 13 illustrate stages in the manufacture of a third and preferred form of the invention.

The construction of the convertor is commenced by positioning on a sheet 56 of 0.002 inch (0.05 mm.) thick polystyrene the twisted loop 53 of the heater wire and a second enamelled wire 57 employed later in the construction in defining the extent of the plating of the constantan wire (see FIG. 9). Each wire is drawn tight and fixed with polystyrene cement to the polystyrene sheet. These wires are fixed very accurately in relation to one another, this being ensured by means of guide lines scribed on a surface on which the polystyrene sheet is first laid.

Figures 10, 11:
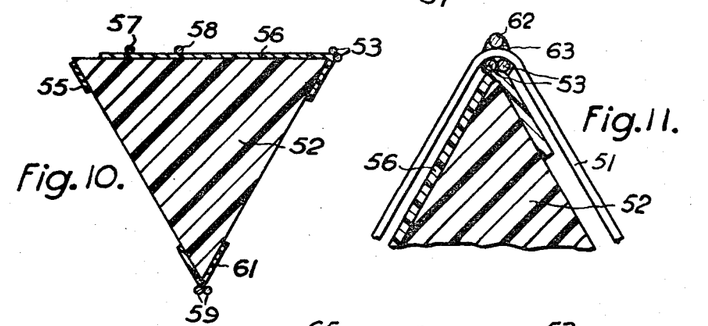

The sheet 56 of polystyrene, with the two wires 53 and 57 fixed to it is applied to one face of the polystyrene core 52, as indicated in FIG. 10, and is positioned accurately with the heater wire 53 along one apex of the core. The sheet is bent round the edges of the former and the thin mica strip 55 (suitably 0.02 by 0.001 inch 0.5 by 0.025 in.) is cemented along one side of the former as shown in the figure. When the two wires 53 and 57 have been positioned, a third wire 58, of tinned copper, is cemented between them (as also indicated in chain lines in FIG. 9) substantially parallel to them, but with less critical accuracy. This third wire is used to make contact with the constantan helix when it is plated. The support wire 59, similar in size to the heater wire 53, is attached to a second piece 61 of polystyrene sheet which is then cemented to the core, with the wire along the remaining apex of the core 52 as shown in the figure. The core is then mounted in a winding machine of conventional design and the constantan wire 51 is wound on, at the desired spacing. The wire is wound under considerable tension; generally as much as can be applied without the wire breaking. The winding completed, it is necessary to fix the turns of the helix to the heater wire 53 and the support wire 59. Up to this stage, adhesion has been effected with polystyrene cement or by the softening of a polystyrene surface with a solvent such as benzine. Now, however, an epoxy resin cement capable of sustaining a maximum temperature of 240° C. is used. A resin is employed which is of very low viscosity and a special precaution must be observed in order to restrict it to the place where it is needed and prevent it from flowing over considerable areas. FIG. 11 shows how this is effected. A guide wire 62 is tightly stretched along the heater wire apex of the assembly; it is of fine gauge say 49 (0.012 in. 0.03 mm.) and must be of a kind which can be removed readily from its insulation. With the guide wire 62 in position, epoxy resin cement is fed gradually into the small spaces between guide wire 62, helix and heater wire 53, and it is held in the shape shown at 63 by capillary action, provided no excess of adhesive is applied. Sufficient cement in place, the whole is cured at about 60° C. to set the epoxy resin. The temperature is not sufficiently high to soften the polystyrene unduly. After curing, it is found that the guide wire may be pulled away from the assembly, leaving the helix and the heater wire firmly bonded together but without electrical contact. Similar technique is applied in fixing the helix to the support wire 59.

Figure 12:
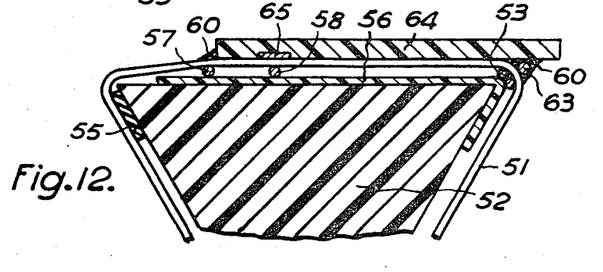

It is necessary to plate part of the constantan helix with copper in order to form the rows of thermo-junctions on the helix. FIG. 12 indicates how a portion of the helix is covered, in between the heater wire 53 and the enamelled wire 57, by cementing a thick polystyrene sheet 64 to these wires with polystyrene cement 60 so that when the whole assembly is immersed in a plating bath, the copper is deposited on the constantan wire except where it is covered by the polystyrene sheet 64. Very short lengths remain unplated where the constantan is secured to the support wire 59 with epoxy cement but these lengths are so small that their effect can be ignored. During plating, electrical connection to the constantan helix is made at every turn through the tinned copper wire 58 and a tinned copper strip 65 carried by the sheet 64.

After plating the helix is washed and dried and then epoxy resin is run along the mica strip 55 to bond it rigidly to the helix. The resin is cured at 60° C. This resin is indicated at 66 in FIG. 13.

Figure 13:
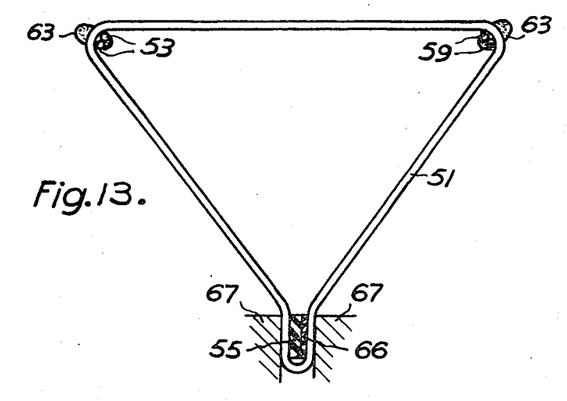

The assembly is now immersed in a solvent for polystyrene and the polystyrene core 52, sheet material 56, 61 and 64 and polystyrene cement are dissolved away. The enamelled wire 57, the tinned wire 58 and the tinned strip 65 are readily withdrawn. The helix is left bonded firmly to the heater and support wires 53, 59 and mica strip 55, the epoxy resin used for the purpose being unaffected by the solvent for polystyrene. After removing any surplus turns of the helix from each end, it is convenient to bring out both connections to the helix at one end, together with the heater connections. This may be effected at this stage by connecting the far end of the thermocouple helix to the support wire 59 and using that as the return connection.

The helix is slightly deformed in order to facilitate mounting, and the mode of deformation is indicated in FIG. 13; the region of the helix at the location of the mica strip 55 is placed in a suitable clamp indicated at 67 and by light pressure the uncemented turns of the helix are flattened against the mica strip 55 and the strip 55 brought into a symmetrical position with the length of its cross-section perpendicular to the top of the helix. This flattened portion provides the cold junctions when the helix is suitably mounted. This flattening causes the cross-section to depart somewhat from an equilateral triangle and if desired this could be allowed for in the cross-section of the core 52 but reasonable variation in the cross-section will not detract from the stiffness of the assembly. The preparation of the thermocouple assembly is now complete and the next stage is to mount it in a suitable container.

Figure 14:
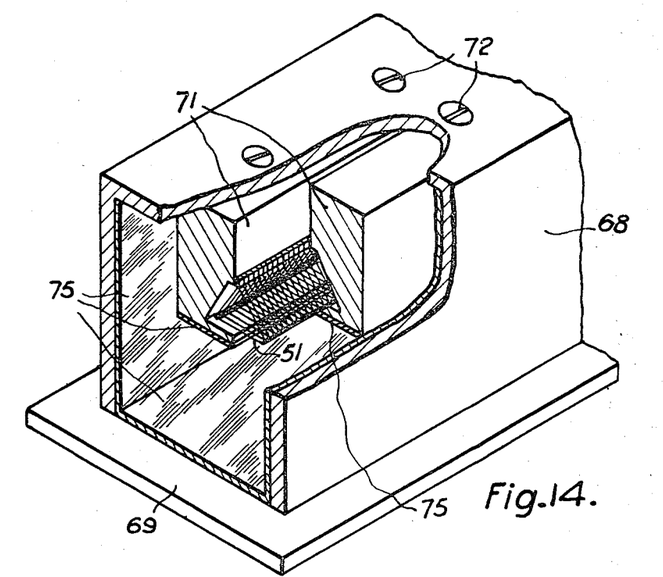
FIGS. 14 and 15 illustrate the mounting of the convertor in its housing.
Figure 15:
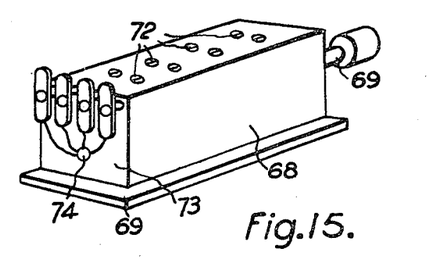

A suitable mount is illustrated in FIGS. 14 and 15. It consists of a copper box in two parts, a housing 68 and a base 69. The thermocouple assembly is clamped along the flattened edge insulated by the mica strip 55 inside a cavity formed between two copper blocks 71 which in turn may be secured by screws 72 to the housing. The cavity is open at least at one end to permit the connections to the thermocouple assembly to be taken out. The heater and thermocouple leads are taken through an end wall 73 of the housing by means of a four-way glass-to-metal seal 74, as indicated in FIG. 15. The seal is secured into the end wall with a high melting point soft solder, lead being a suitable one. The solder may be prevented from running over the whole end face by stretching two wires across the outer face, above and below the seal. The seal is protected by coating with a ceramic paint; this prevents the seal made with the high melting point solder being damaged by contamination with lower melting point solder used at a later stage of construction. Connection between the leads from the thermocouple assembly and the leads through the glass-to-metal seal 74 is made within the housing with the aid of high melting point soft solder. In order to minimise radiation loss from the thermocouple assembly the outer faces of the copper blocks 71 and the inner faces of the housing 68 and base 69 are lined with sheets of aluminised mica indicated at 75 which may be secured with epoxy resin cement.

The next stage is to secure the housing to the base. The housing 68 containing the thermocouple assembly, is placed on the base 69, as in FIG. 14 and clamped down on a flat surface which is capable of being heated, e.g. by means of a built-in electrical resistance heater, to about 240° C. A solder melting just below this temperature, e.g. an antimony tin alloy, is allowed to run round the joint between housing and base, using an acid flux. The heat is then withdrawn and the whole allowed to cool in the clamp. The opposite end of the housing 68 from the glass to metal seal 74 has fixed into it a tube 76, initially say six inches (15 cms.) in length. During the soldering process just described a current of argon is passed through the tube into the housing and is allowed to escape through a hole normally occupied by one of the screws 72 securing one of the copper blocks 71 to the housing 68. When the soldering is completed the flow of argon is slackened and the screw inserted and sealed.

The completed assembly is then transferred to an oven at as high a temperature as can safely be applied without melting any of the solder employed in the assembly or breaking down any of the epoxy resin bonding. A temperature between 200° and 220° C. is suitable. The assembly is connected to a vacuum pump through the tube 76, preferably via a cold trap, and is evacuated to a fairly hard vacuum, over a period of a few hours. In the meantime the assembly may be tested electrically for continuity and goodness of insulation. The latter should be of the order $10^9$ ohms. When the full vacuum is reached, the tube 76 is sealed, e.g. pinched flat over a length of about ⅛ inch and then finally cut off. It is found that the arrangement maintains the vacuum satisfactorily. The device appears finally as shown in FIG. 15.

A differential thermal converter can be made by making the wire 59 serve as the second heater and arranging the plating so that the side of the helix which is horizontal in FIG. 13 is bare, the other two sides being plated. This will involve cementing the protecting sheet 64 to the line of epoxy resin cement at the wire 59 as well as that at the wire 53. In this case a six-way glass-to-metal seal will be used to allow connection to be made to the two heaters and the helix.

It has been found that the temperature coefficient of output of a converter constructed in accordance with the invention can be predetermined within a range by suitable control of the ratio of the cross-sectional areas of the core conductor and the coating substance.

Figure 16:
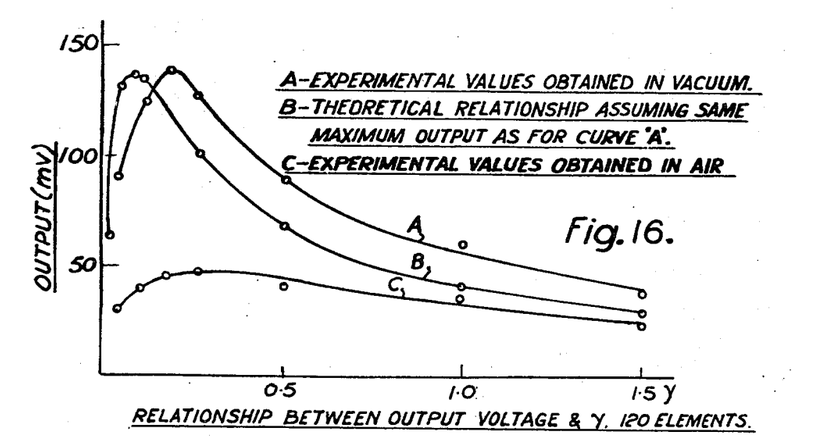
FIGS. 16, 17 and 18 are graphs illustrating the effect of varying the thickness of the coatings on the continuous conductor.

In further explanation a variation in the thickness of the plating alters the properties of the converter by changing the thermal conductance of those sections of the wire. Further, the output resistance of the converter is altered. Each section of plated wire forms a thermocouple pair in which is circulating current is set up when there is a temperature difference. The magnitude of the circulating current is affected by the resistance and hence the thickness of the coating. The thicker the coating the larger is the thermal conductance and a given power input produces a lower temperature rise and hence a lower E.M.F. at the hot junctions. But a thicker coating reduces the reverse voltage associated with the circulating currents. Hence there is an optimum thickness of plating for maximum output from the converter. FIG. 16 shows the variation of output with thickness of coating obtained experimentally in air and in vacuum for constantan and copper and also the theoretical variation in vacuum. The curves of FIG. 16 show that the maximum output is obtained when the ratio $\gamma$ is of the order of 0.25. The ratio $\gamma$ is defined as the ratio of the cross-sectional area of the copper coating to the cross-sectional area of the constantan wire.

Figure 17:
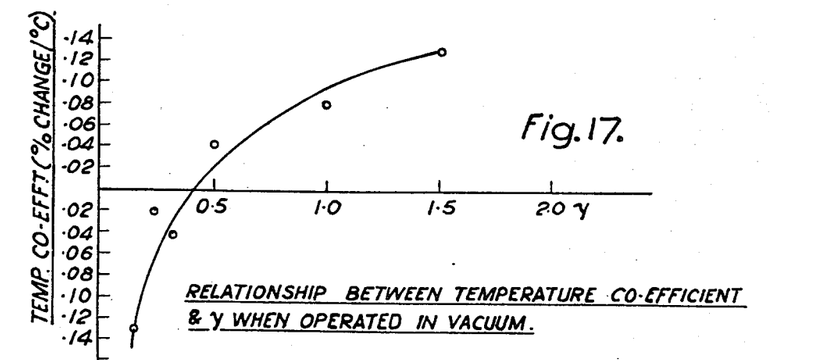

Varying the thickness of the copper coating also allows the temperature coefficient of the converter to be predetermined. FIG. 17 shows a plot of temperature coefficient against the ratio $\gamma$ with the converter operating in a vacuum. The temperature coefficient is found to be constant over an output range of 6 to 1 and for thermocouples made with a temperature coefficient in the region of zero the factor output/(current)$^2$ is found to be constant to within 0.1% over that range. Zero temperature co-efficient occurs with a $\gamma$ ratio of the order of 0.4.

Figure 18:
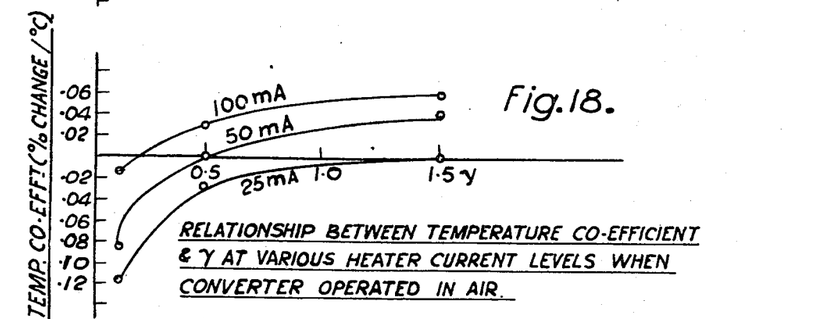

In air the temperature co-efficient is found to vary with heater current, probably due to the large convection losses which are not directly proportional to temperature but to some power slightly higher than unity. The values obtained in air are shown in FIG. 18 and from these it is seen that for a given operating current there is a particular thickness of plating that gives zero temperature coefficient. This places a restriction on the usefulness of the device for the most accurate work and for such purposes the thermal converter is maintained in a vacuum as described above.

Curves of similar form are obtained for other combinations of conductive materials and by plotting such curves the values of $\gamma$ for zero coefficient or maxium ouput can be obtained.

As explained above, the primary use envisaged for the convertors according to the invention is as a transfer device in accurate A.C. measurements, especially in obtaining more accurate results in current measurements at audio and high frequencies and in the operation of high frequency wattmeters. The convertor can be used at high megacycle frequencies since the capacitance on the input side is only a few pF, and even better performance might be obtained by substituting a monofilar for the bifilar heater (or heaters). Another field of possible use for the convertor is for computers.

It will be understood that variations in the structures shown in the drawings are examples and may be made within the scope of the invention some of which have been pointed out, such as the use of other combinations of material than constantan and copper, and other soluble cores than polystyrene. Again other materials than mica may be used as insoluble supports and other materials than copper for the external casing.

What I claim is:

1. A method of making a thermoelectric convertor which includes the steps of winding a length of alloy resistance wire in a closely spaced helix on a core of electric insulating material soluble in a specific solvent, said core having a cross-section with at least two spaced apices, securing a respective longitudinal support to said helix at each apex by a cement which is insoluble in said specific solvent, at least one of said supports being capable of heating by the passage of an electric current, cementing a cover sheet over a part of the periphery of said helix extending from said last mentioned support, said cover sheet and the cement by which it is secured being soluble in said specific solvent, immersing said helix in an electroplating bath and thereby electroplating the part of the helix not covered by said sheet, and thereafter dissolving away the cement and at least sufficient of said core and cover sheet to remove the helix with said supports attached thereto from said core and cover sheet.

2. A method as set forth in claim 1 wherein said core is of triangular section and a support is provided along all three apices.

3. A method as set forth in claim 1 wherein said supports are located along the apices of the core before the helix is wound on it.

4. A method as set forth in claim 1 wherein one of said supports and a longitudinal wire spaced therefrom are first secured to a sheet of material soluble in said specific solvent and before the helix is wound said sheet is so secured to said core that the specific solvent will release it, and said cover sheet is cemented to said support and wire.

5. A method as set forth in claim 4 wherein said core is of triangular section and a lonigtudinal support in the form of a strip of material insoluble in said specific solvent is secured to said core before winding the helix by a cement soluble in the specific solvent, and after winding the helix is secured to said strip by a cement which is insoluble in the specific solvent.

References Cited

UNITED STATES PATENTS

| | | | |
|---|---|---|---|
| 2,672,492 | 3/1954 | Sukacev | 29—573 |
| 2,674,641 | 4/1954 | Holmes | 29—573 |
| 2,807,657 | 9/1957 | Jenkins et al. | 29—573 |
| 3,381,368 | 5/1968 | Wilkins | 29—573 |

PAUL M. COHEN, Primary Examiner

U.S. Cl. X.R.

29—424; 136—201